No. 819,276. PATENTED MAY 1, 1906.
R. C. HEUNSCH.
ROTARY ENGINE.
APPLICATION FILED APR. 21, 1905.

WITNESSES:
W. H. Ourand
Parker H. Sweet Jr.

INVENTOR
R. C. Heunsch
By E. M. Marble
Attorney

No. 819,276. PATENTED MAY 1, 1906.
R. C. HEUNSCH.
ROTARY ENGINE.
APPLICATION FILED APR. 21, 1905.

Witnesses
W. H. Durand
Parker H. Sweet Jr.

Inventor
R. C. Heunsch,
By E. M. Marble
Attorney

No. 819,276. PATENTED MAY 1, 1906.
R. C. HEUNSCH.
ROTARY ENGINE.
APPLICATION FILED APR. 21, 1905.

Witnesses
W. H. Ourand
Parker H. Sweet Jr.

Inventor
R. C. Heunsch,
By E. M. Marble
Attorney

UNITED STATES PATENT OFFICE.

RUDOLPH C. HEUNSCH, OF WASHINGTON, DISTRICT OF COLUMBIA.

ROTARY ENGINE.

No. 819,276.　　　　Specification of Letters Patent.　　　　Patented May 1, 1906.

Application filed April 21, 1905. Serial No. 256,720.

*To all whom it may concern:*

Be it known that I, RUDOLPH C. HEUNSCH, a citizen of the United States, residing at Washington, in the District of Columbia, have invented new and useful Improvements in Rotary Engines, of which the following is a specification.

My invention relates to rotary steam-engines; and it consists in the construction and arrangement of the several parts, which will be hereinafter fully described, illustrated in the drawings, and particularly pointed out in the claims.

One object of my invention is to provide a rotary steam-engine which shall be simple and compact in its construction, reliable and efficient in its operation, and durable in use.

A further object of my invention is to provide in a rotary steam-engine an annular steam-chamber for a revolving piston which shall be perfectly circular in form having side plates and packing-rings of the same form, so that said chamber when made as hereinafter described shall be absolutely steam-tight and shall so continue under the highest pressure.

A still further object of my invention is to provide the steam-chamber, the piston revolving therein, and all the essential parts of such form and construction as to render their operation frictionless or as nearly so as can be secured in a power-machine.

The ultimate object of my invention is to provide means and mechanism in a rotary steam-engine by which greater power and better results shall be obtained from a given quantity of coal or other fuel than has ever been obtained.

I accomplish these objects by means of the mechanism illustrated in the accompanying drawings, wherein like numerals of reference designate corresponding parts, and in which—

I will now proceed to describe the construction and operation of the several parts of the machine illustrated in the drawings by which I secure and accomplish the objects above mentioned.

In the drawings the casing 1 of the engine is circular in form and provided with an annular steam-chamber 2 and with base-flanges 3, by which said engine may be firmly secured to a suitable foundation. The annular steam-chamber 2 is adapted to receive and, as shown, does receive an annular wheel-like piston 4, suitably secured by a spline or equivalent means upon the power-shaft 5 in such manner as to prevent any possible endwise thrust or movement of the shaft being imparted to the casing, said piston being provided on each side with hubs 6, formed integral therewith, which project outwardly a sufficient distance from the side edges of the annular steam-chamber 2 for reasons hereinafter appearing.

The power-shaft 5 preferably, though not necessarily, passes through the engine-casing from side to side, and the piston 4 is secured upon said shaft by a spline or key 5', which piston is of so much less diameter than the interior of the annular steam-chamber as to leave an annular steam-space 2', which is rectangular in cross-section and is inclosed on the sides by wear-plates 4', which are secured between annular casing 1 and the plates 1' and extend from the outer edge of the casing inward and make a close joint with the peripheral edge of the piston 4 and the wear-plates, said wear-plates forming the interior lining for the side walls of the annular steam-chamber 2.

In order to insure that no leakage of steam shall occur at the joints between the outer edge of the piston and the inner edge of these wear-plates 4', I pack the joints by split resilient rings 4'', which are compressed radially into the circular space between the edges of the wear-plates 4' and are compressed inward against the sides of the piston by springs 5", located in the openings in the side plates 1' of the engine-casing. The outward pressure of these rings against the edges of the wear-plates and their lateral pressure against the sides of the piston effectually provide against any leakage of steam at the points mentioned, and in order to take up the wear on the rings 4" and also regulate their frictional contact with the piston I fasten ring 5''' to the side plates 1' of the engine-casing by means of screws having adjusting-nuts 7, so that the springs 5" may be tightened from time to time as occasion may require.

Figure 4:
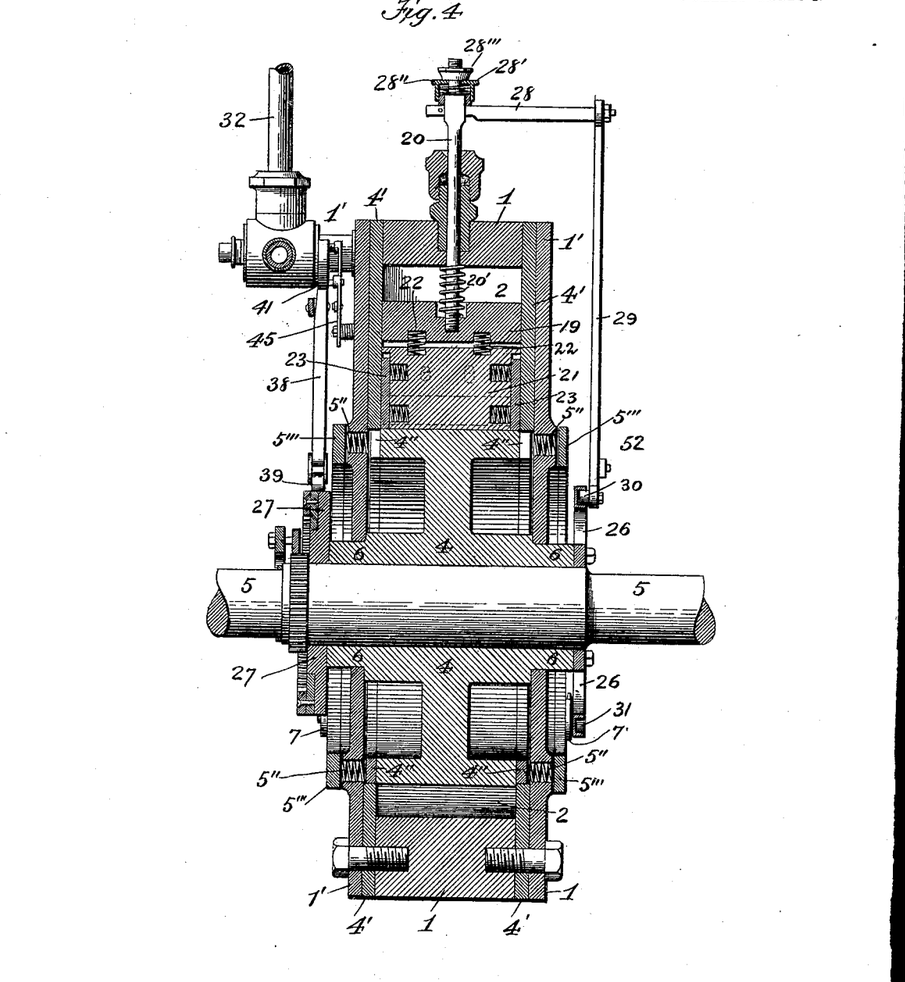
Fig. 4 is a vertical longitudinal section of the entire engine.
Figure 5:
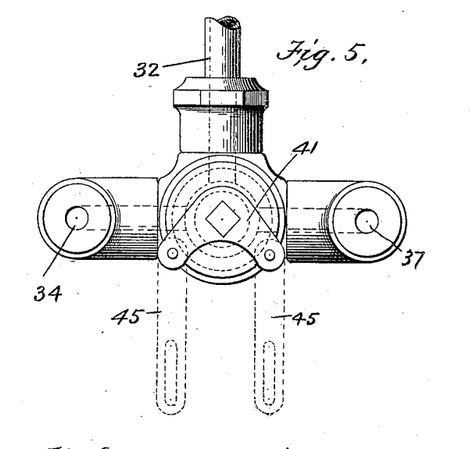
Fig. 5 is a detail side elevation of the inlet-pipe for the steam.
Figure 6:
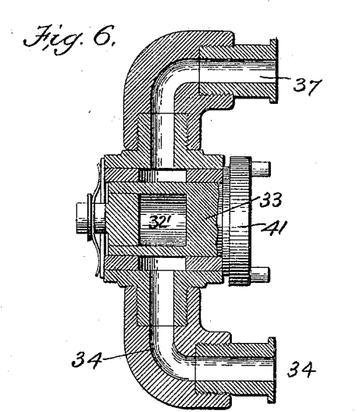
Fig. 6 is a vertical longitudinal section of the same.
Figures 7, 8:
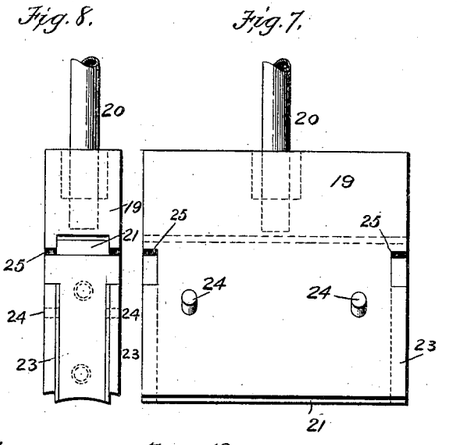
Figs. 7 and 8 are side and end views, respectively, of the steam-abutment.
Figure 9:
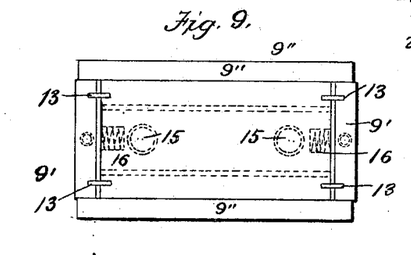
Fig. 9 is a top plan view of the piston-head.
Figure 10:
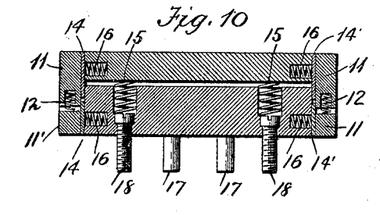
Figs. 10 and 11 are respectively longitudinal and cross sections of the piston-head.
Figure 11:
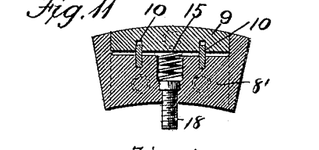
Figure 12:
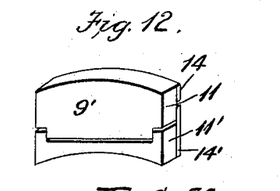
Fig. 12 is a detail perspective view of the end block of the piston-head.

The annular piston 4 is provided at one point on its periphery with a head 8, against which the expansive force of the steam reacts and by means of which the piston and the power-shaft are rotated. This head is constructed with particular reference to making a steam-tight joint with the inner walls of the annular steam-chamber 2, in which it revolves. As fully illustrated in Figs. 9 to 12, it consists of a solid block-like body portion 8', that is recessed on top to receive a plate 9. The ends of the part 8' are also recessed to receive end blocks 9', the construction of which is shown in Fig. 12 in detail. The top plate fits down into the recess between the side flanges 9" of the part 8', and the ends of the flanges project so as also to inclose the blocks 9'. The particular purpose of these end blocks and top plates is to maintain the piston-head steam-tight, even though there should be some wear between the parts, and to automatically compensate for any wear that may develop and to keep the parts always in close connection. To this end the top plate is provided with liners or strips 10, which are set edgewise in grooves formed one-half in the plate and one-half in the body portion of the head 8, as clearly shown in Fig. 11, and the end blocks are made in sections 11 11', with springs 12 between them to press the parts against the upper and lower walls of the annular steam-chamber 2, these sections being also provided with liners or strips 13, similar to those designated 10 above and for a similar purpose. Face-plates 14 14' are also provided on the inner sides of the end blocks, which break joints with the joints between the sections of the block, so as to still further provide against the leakage of steam between the parts. The top plate 8 is pressed up against the roof of the steam-space by the springs 15, and the end blocks are pressed laterally outward against the sides of the same space by similar springs 16, all of which springs are inclosed in recesses formed in the body part of the head. The head is secured upon the periphery of the annular piston 4 by means of dowel-pins 17 or screws 18, and it is characteristic of the construction that all the joints between the sections of the head are break-joints, so that every passage for the steam is closed, and that the different portions of the head press elastically against all sides of the steam-space, thus effectually providing against the passage of steam past the head. I have also constructed and arranged an abutment for the engine which consists of a rectangular block 19, which is connected to a plunger-rod 20 and slides in a guideway provided for it in the casing 1, and it is operated by means that will be hereinafter described. The block 19 is hollowed out from the under side and incloses a supplemental block 21, projecting below the main block and having a slight vertical movement therein, as indicated in Figs. 4 and 8. Springs 22 are inclosed in recesses in the block 19 and allow the lower edge of the block 21 to accommodate itself to wear or slight unevenness of the peripheral surface of the piston. The ends of the supplemental block 21 are cut away, as shown in Fig. 4, and face-plates 23 23' are let in so as to bear against the wear-plates 4' as the abutment moves up and down and also against the side walls of the steam-space when the abutment is stationary. The supplemental block may, if desired, have guide-pins 24 projecting through slightly-elongated slots in the walls of the main block to prevent the two parts from being disconnected when out of the machine, and the face-plates 23 will have laterally-projecting flanges at their upper ends that play with a certain freedom of movement in cross-slots 25, cut in the ends of the outer block 19. The face-plates 23 are backed by springs seated in recesses in the block 21, similar to the springs hereinbefore described for pressing the parts of the piston-head against the walls of the steam-space, and the same structural features characterize the abutment and the head—viz., so that though sectional in construction the joints are all covered and closed so as to preclude the passage of steam.

The inclosing side plates 1', heretofore referred to, fit snugly against the sides of the casing 1, to which they are firmly secured by suitable bolts, and also against the sides of the annular steam-chamber 2, and hubs 6 of the piston 4, abutting against and projecting through openings in the central part of the said plates, as shown more fully in Fig. 4. At each side of the hubs 6 of the rotary piston there are cams provided to operate the abutment and to work the valve for the admission of steam. Of these cams 26 is the one which operates the abutment and 27 the one which works the valve. The plunger 20 of the abutment has a spring 20' coiled around it and serves to return the abutment after it has been raised. It also has a connection at its upper end with an arm 28 projecting from a vertical rod 29, that carries a roller 30 at its lower end and running in the groove 31, formed in the cam 26. The lower end of the rod 29 is guided and controlled in its movements by a link 32, which is pivoted to the engine-casing near the periphery.

The cam 26 is provided near its periphery with a groove or channel 31, extending entirely around the face of the same and wherein the roller 30 on the lower end of the vertical rod 29 rotatably fits, as shown more fully in Fig. 4. This construction enables the roller 30 to always travel in the groove or channel, so that in case anything happens to the spring 20' it will not interfere with the running of the machine. I connect the plunger 20 to the arm 28 by a spring 28', which is covered by a cap 28'' and made adjustable by a nut 28'''. This spring 28' presses down on the arm 28 after the abutment has contacted with the bottom of the steam-space, and when of course the spring 20' can no longer act and being of less tension than the spring 20' it yields before the plunger begins its upward movement.

The cam 26 is provided near its periphery with a groove or channel 31, extending entirely around the face of the same and wherein the roller 30 on the lower end of the vertical rod 29 rotatably fits, as shown more fully in Fig. 4. This construction enables the roller 30 to always travel in the groove or channel so as to prevent rattling and to run noiselessly, and to still further secure this result I connect the plunger 20 to the arm 28 by a spring 28', that is covered by a cap 28'' and made adjustable by a nut 28'''. This spring 28' presses down on the arm 28 after the abutment has contacted with the bottom of the steam-space, and when of course the spring 20' can no longer act and being of less tension than the spring 20' it yields before the plunger begins its upward movement.

Steam is admitted to the engine through the pipe 32 into the chamber 32' of the oscillating valve 33 and is conducted through pipe 34 and passage 35 when the engine is to run in one direction and through the pipe 37 and passage 36 when it is reversed. The valve 33 is operated to admit steam and cut it off once in every revolution of the piston, the said valve being operated by a rod 38, having a roller 39 at its lower end running on the cam 27 and being controlled in its movement by the link 40, pivoted to the outer side of the engine. The valve-stem is provided with a cross-head 41, having two arms, and the upper end of the rod 38 is arranged to strike either arm as the engine is set to run in one direction or the other, the position of the rod being controllable by a hand-lever 42, that is centrally pivoted at the side of the engine-casing, and which also controls the exhaust-valves 43 43' by the interposition of a connecting-rod 44. The oscillating valve 33 is spring-actuated, so as to close automatically after each actuation by the opening-rod 38, and to this end a link or strap 45 is pivotally connected to each arm of the cross-head 41, and a spring 45', which is fastened on the side plate 1' of the casing, exerts a constant downward pull tending to close the valve. As the piston 4 revolves the rod 38 strikes one of the arms of the valve cross-head 41 and opens the valve to admit the steam. The high part of the cam 27 holds the valve open until just before the piston-head reaches the exhaust, when the rod falls, and the spring 45' immediately closes the valve 33 and shuts off the steam until the piston-head has passed the abutment, when the rod 38 rises and again opens the valve and admits the steam again.

Figure 1:
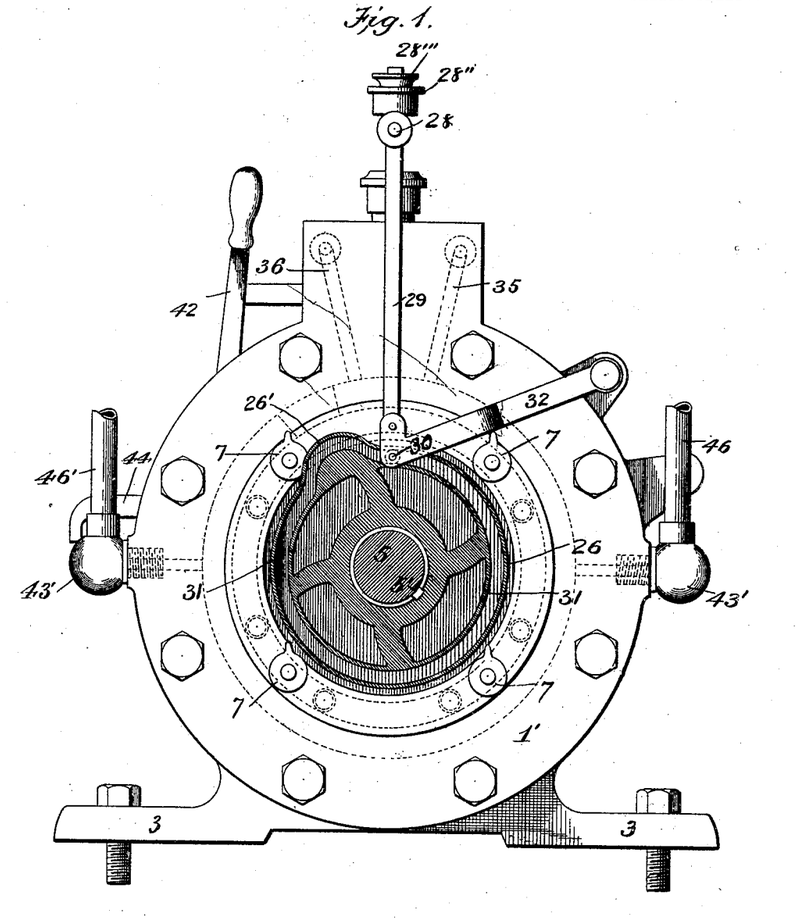
Figure 1 is a side elevation of one side of the engine, showing the cam mechanism for raising the abutment in the engine-cylinder.
Figure 2:
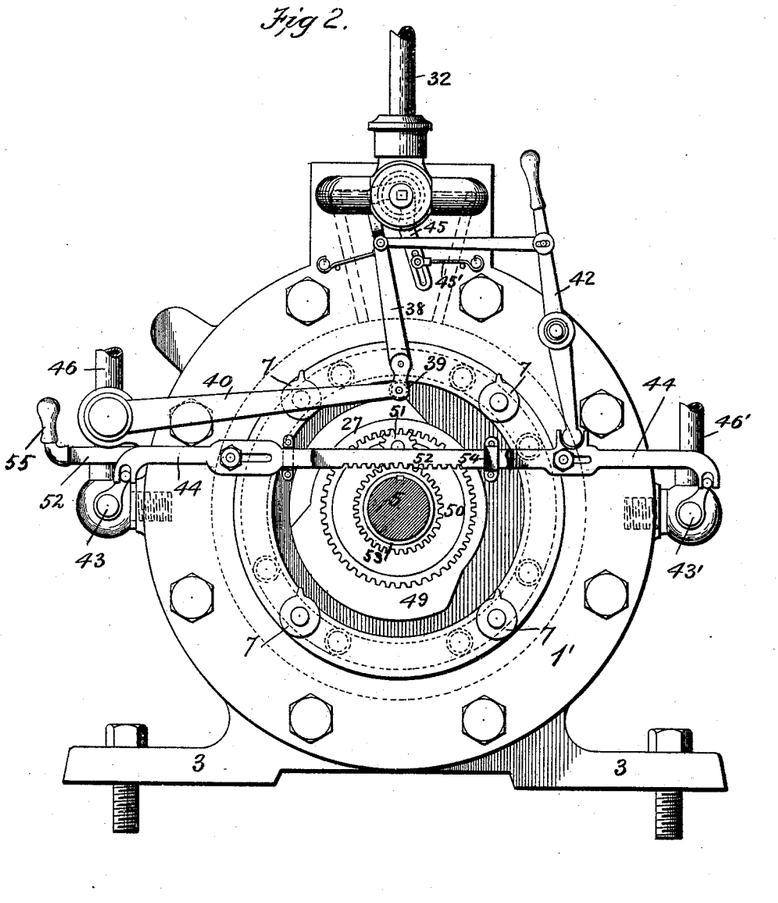
Fig. 2 is a similar view of the opposite side of the engine, showing mechanism for controlling the admission of the steam to the cylinder, the exhaust from the same, and the mechanism for slowing down the speed.
Figure 3:
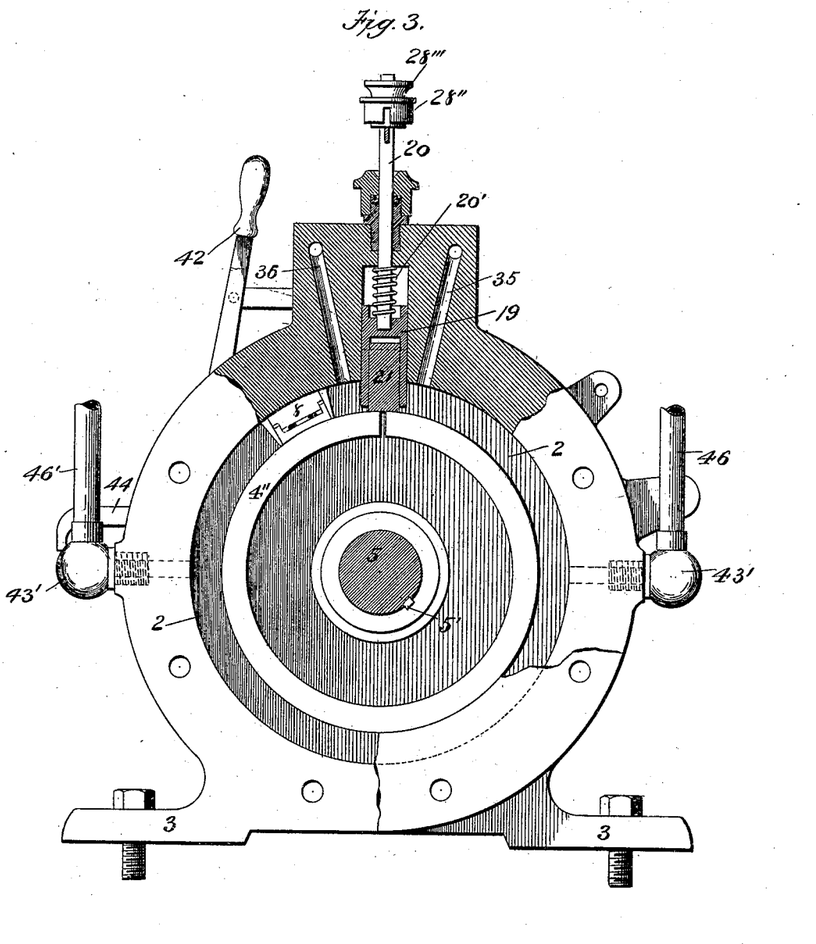
Fig. 3 is also a side elevation with parts broken away to show more fully the packing-ring in position, the abutment, and piston-head.

The engine exhausts through the pipes 46 46', which communicate, through the valves 43 43', respectively, with the steam-space in the annular steam-chamber 2 at diametrically opposite points. It is of course very important that the abutment should be raised immediately that the exhaust is opened, and the cam projection 26' of the cam 26 is therefore very abrupt, as shown in Fig. 1. The steam-valve should, however, be held open until just before the piston-head reaches the exhaust-port, and for this reason the cam 27 is a long one. It will of course be understood that the two cams 26 and 27 are positioned so as to properly time the admission and exhaust of the steam. The abutment is lowered by the spring 20' immediately after the head of the piston passes beneath and clears the abutment and the mouth of the steam-inlet, while simultaneously therewith the steam-pressure is admitted to rotate the piston. The abutment is raised as soon as the piston-head has cleared the exhaust-opening and the exhaust has left the cylinder and while the steam-pressure is cut off, the momentum of the piston carrying the piston-head around and under the raised abutment, so that when the piston-head has passed the said abutment and the mouth of the steam-inlet the abutment is automatically seated in its place on the periphery of the piston ready for another rotation of the piston, as already stated. The auxiliary springs 22 give the inclosed lower block 21 of the abutment a capability of moving slightly to accommodate itself to any possible irregularity in the peripheral surface of the piston.

Figures 13, 14, 15:
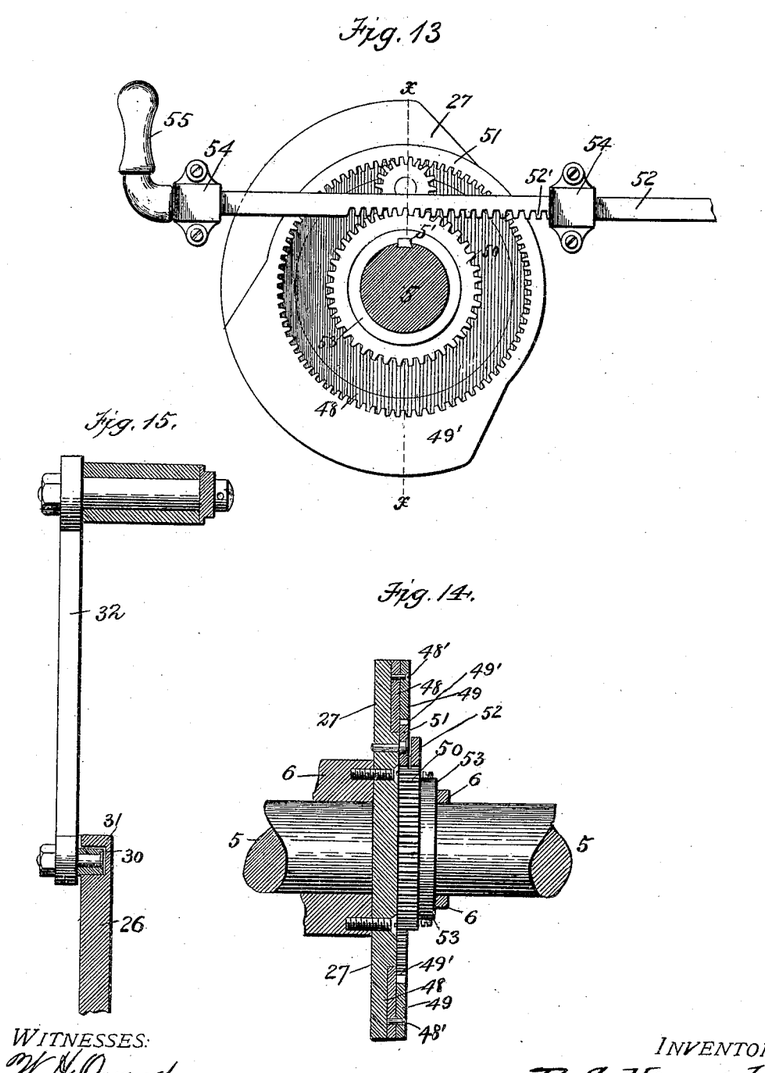
Fig. 13 is a front elevation of the cut-off mechanism and speed-regulator.
Fig. 14 is a vertical cross-section of the same, taken on the line $x$ $x$ of Fig. 13.
Fig. 15, a detail view of the mechanism for operating the steam-abutment.

The mechanism for slowing down or regulating the speed of the engine may be described as follows: Upon the face of the cam 27 and fitting in a right-angled recess on the same is arranged a plate 48, having a central circular opening engaging with the raised edge of the right-angled recess in such manner that the face of the plate 48 lies flush with the face of the cam 27, and upon this plate 48 is rigidly secured a corresponding plate 49, having the edge of its central circular opening provided with the teeth or cogs 49', extending entirely around the circle, the plates 48 and 49 being secured together, as above stated, by bolts 48', thus forming an auxiliary cam which is adapted to move around upon the face of the cam 27 for the purpose hereinafter described. Near the outer projecting end of the hub 6 of the piston is loosely mounted a gear-wheel 50, and intermediately between it and the teeth 49' of the plate 49 is journaled the pinion 51, the teeth of which mesh with the teeth of the gear-wheel 50 and also with the teeth 49' of the plate 49, as fully shown in Fig. 13. A metallic ring or washer 53 is keyed or otherwise secured to the hub 6 and bears against the outer face of the loosely-mounted gear-wheel 50 to hold the same in position against the face of the cam 27, as shown more fully in Fig. 14. A rack-bar 52, having its under surface provided with a series of teeth or cogs 52', which mesh with the teeth of the gear-wheel 50, is arranged in bearings 54, secured to the side of the casing, and is provided with an operating-handle 55, as shown.

In the operation of my rotary engine steam is admitted to the annular steam-chamber 2 immediately after the head 8 of the piston passes the mouth of the steam-inlet 35, the abutment being down in contact with the peripheral surface of the piston and the steam-reacting against said head 8 to rotate said piston and its power-shaft 5. When the piston-head passes the exhaust-opening 43', the roller on the lower end of the rod 38 drops into the depressed portion of the cam 27, causing said rod 38 to move downwardly and leave its upper end free from engagement with the arm of the cross-head of the oscillating valve 33, which is then closed by the link 45 and its spring 45' to shut off the steam until the head 8 of the piston passes beneath the abutment and leaves the mouth of the steam-inlet 36 for the admission of more steam, said abutment being raised by the plunger-rod 20, acting in connection with the rod 28, and the vertical rod 29 carrying the roller 30 at its lower end and said roller running in the groove 31 of the cam 26, said abutment being raised when the roller 30 mounts upon the head of the cam, the spring 20' serving to again lower the abutment in the manner hereinbefore described. Steam is thus alternately admitted and shut off by the contact of the upper end of the rod 38 with either arm of the cross-head of the oscillating valve, according to the direction in which the piston is to be rotated, the position of the rod 38 being readily controlled by the hand-lever 42, which is pivoted at the side of the engine-casing and which also controls the exhaust-valves by the interposition of the connecting-rod 44. The steam is entirely cut off when the upper end of the rod 38 is moved directly between the two arms of the cross-head of the oscillating valve. When it is desired to slow down or retard the rotation of the piston, the rack-bar 52 is drawn outwardly, thereby turning the gear-wheel and rotating the pinion 51 in a reverse direction thereto, by which means the cam, formed by plates 48 and 49, is drawn around on the face of the cam 27 toward its head or enlarged portion to reduce the diameter of its bearing-surface, and thus lessen the steam force exerted upon said piston by drawing out the rack-bar by degrees or all the way, according to the rate of speed which may be required.

By the construction of the parts heren shown and described I secure a steam-tight annular chamber in a practically frictionless and compact rotary engine, one which, on account of the form and the shape of its parts, will utilize to a greater extent than has heretofore been done the full expansibility of the steam, and thus produce more power from a given quantity of fuel than has been heretofore attained.

I do not limit myself to the exact construction of the parts in the machine as shown in the drawings, but claim that I have a right to be protected in any and all construction of parts within the scope or principle of construction and operation herein described and shown.

Having thus described my invention, what I claim as new, and desire to receive by Letters Patent, is—

1. A rotary engine having a casing, a circular piston with hubs projecting laterally beyond the casing, and lining-plates extending inward within the casing to the peripheral edge of the piston, said piston being splined on the engine-shaft, and the side plates of the casing extending inward to the hub of the piston.

2. In a rotary engine, the combination of an annular casing, an annular piston within the casing, annular plates forming the inner lining for the side walls of the steam-space, and a spring packing-ring pressing outwardly against the inner edge of the lining-plates, and inwardly against the sides of the piston.

3. In a rotary engine, the combination of an annular casing, a rotating piston within the casing, annular plates lining the side walls of the steam-space from the casing inward to the peripheral edge of the piston, a spring-ring, pressing outward against the inner edge of the lining-plates, springs pressing the ring inward laterally against the piston, and means for adjusting the springs.

4. In a rotary engine, the combination of an annular casing, a rotating piston within the casing, annular plates lining the side walls of the steam-space from the casing inward to the peripheral edge of the piston, a spring-ring pressing outward against the inner edge of the lining-plates, side plates inclosing the lining-plates, the piston and the ring, recesses in the side plates, springs inclosed in said recesses and pressing the ring against the piston, external rings on the side plates outside of the springs, and means for adjusting the plates to tighten the springs.

5. In a rotary engine, the combination of an admission-valve having a head 41, a spring-actuated link 45, connected to the arms of the head, a cam on the engine-shaft, and a rod reciprocated by the cam and acting on the arm of the valve-head in opposition to the spring.

6. In a rotary engine, the combination of an admission-valve having a head 41, spring-actuated links 45, connected to the arms of the head, a cam on the engine-shaft, a rod reciprocated by the cam and adapted to act on either arm of the valve-head, and a lever 42, for adjusting the position of the rod.

7. In a rotary engine, a piston having a head consisting of a body portion 8', a spring-pressed top plate 9 seated in a recess thereon, and end plates 9' pressed outwardly by springs, said end plates consisting of parts 11, 11', pressed apart by spring 12.

8. In a rotary engine, a piston-head having a spring-pressed top plate 9, sectional end plates 9', pressed outward by springs, springs for pressing the sections of the end plates apart, and facing-plates 14, 14', arranged to break joints with the sections of the end plates.

9. In a rotary engine, the combination of the casing, the shaft and the abutment, of a cam on the shaft, a rod operated by the cam, a spring connection between the rod and the plunger of the abutment to press the rod down on the cam, and a spring reacting between the interior of the casing and the top of the abutment.

10. In a rotary engine, the combination with the casing, the shaft and the abutment, of a cam on the shaft, a rod 29 operated by the cam, a pivoted link 32 to control the rod, a spring connection between the rod and the plunger of the abutment, and means for adjusting the spring.

11. In a rotary engine, the combination with the hub of the piston, of a cam 26 provided with a groove or channel 31, for the reception therein of the roller 30 on the lower end of the rod 29, a pivoted link 32 to control the movement of said rod, a spring connection between the rod and the plunger of the abutment, and means for adjusting said spring.

12. In a rotary engine, an abutment comprising a block 19 recessed to receive a supplemental block 21, springs pressing the block 21 below the edge of the main block, and facing-plates 23, let into the side edges of the supplemental block and pressed outward against the sides of the steam-space by springs.

13. In a rotary engine, an abutment comprising a hollow block 19, a supplemental block 21, inclosed therein, springs 22, allowing the supplemental block to yield independently of the block 19, facing-plates 23, let into the ends of the supplemental block, transverse slots 25, in the ends of the main block 19, flanges on the facing-plates 23 fitting in said slots, and springs pressing the facing-plates against the sides of the steam-space.

14. A rotary engine, the combination with the cam 27 attached to the hub of the piston, and having loosely mounted thereon plates 48 and 49, forming an auxiliary cam adapted to move sidewise upon the cam 27; said plate 49 having a series of teeth 49' extending around the peripheral edge of its central opening, a gear-wheel 50 mounted loosely upon the hub 6, a pinion 51 journaled upon the cam 27 and adapted to rotate between said gear-wheel 50 and the teeth 49', and meshing with the teeth thereof, of a rack-bar 52 provided with teeth which engage the teeth of the gear-wheel 50, to move and adjust the cam, formed by plates 48 and 49, in any desired position upon the face of the cam 27 to retard the speed of the engine.

15. In a rotary engine, the cam 27, attached to the hub of the piston and having plates 48 and 49, forming an auxiliary cam, loosely mounted upon the face thereof; said plate 49 having a series of teeth 49' extending around the peripheral edge of its central opening, and a pinion 51 journaled upon said cam 27, in combination with a gear-wheel 50 loosely mounted upon the hub 6, and means engaging therewith for moving said plates 48 and 49 around upon the face of said cam 27.

In testimony whereof I affix my signature in presence of two subscribing witnesses.

RUDOLPH C. HEUNSCH.

Witnesses:
  PARKER H. SWEET, Jr.,
  C. W. FOWLER.